(12) United States Patent
Yamauchi et al.

(10) Patent No.: US 11,620,498 B2
(45) Date of Patent: Apr. 4, 2023

(54) RECOGNITION APPARATUS, RECOGNITION METHOD, AND PROGRAM PRODUCT

(71) Applicant: KABUSHIKI KAISHA TOSHIBA, Minato-ku (JP)

(72) Inventors: Yasunobu Yamauchi, Yokohama (JP); Kazunori Imoto, Kawasaki (JP); Tomohiro Nakai, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 354 days.

(21) Appl. No.: 16/801,243

(22) Filed: Feb. 26, 2020

(65) Prior Publication Data
US 2020/0372324 A1  Nov. 26, 2020

(30) Foreign Application Priority Data
May 22, 2019 (JP) .............................. JP2019-096345

(51) Int. Cl.
*G06K 9/60* (2006.01)
*G06K 9/62* (2022.01)
(Continued)

(52) U.S. Cl.
CPC ............ *G06N 3/0454* (2013.01); *G06N 3/08* (2013.01); *G06K 9/629* (2013.01); *G06K 9/6267* (2013.01); *G06V 10/40* (2022.01)

(58) Field of Classification Search
CPC ...... G06N 20/00–20/20; G06N 3/0454; G06N 3/08–3/088; G06K 9/6267–9/6287; G06V 10/764–10/765; G06V 10/809; G06V 10/811; G06V 20/41–20/43; G06V 20/698; G06V 30/19173;
(Continued)

(56) References Cited

U.S. PATENT DOCUMENTS

| | | | |
|---|---|---|---|
| 2017/0177972 A1* | 6/2017 | Cricri | G06N 3/0445 |
| 2019/0005387 A1* | 1/2019 | Blayvas | G06N 3/0454 |
| 2022/0067438 A1* | 3/2022 | Li | G06N 3/084 |

FOREIGN PATENT DOCUMENTS

| | | | | |
|---|---|---|---|---|
| EP | 3404578 A1 * | 11/2018 | | G06K 9/00664 |
| WO | WO 2018/163555 A1 | 9/2018 | | |

OTHER PUBLICATIONS

Weng et al., "Residual Attention Network for Image Classification", ICVR, 2017, 9 pages.
(Continued)

*Primary Examiner* — Brian Werner
(74) *Attorney, Agent, or Firm* — Oblon, McClelland, Maier & Neustadt, L.L.P.

(57) ABSTRACT

A recognition apparatus according to an embodiment of the present disclosure includes a memory and a hardware processor coupled to the memory. The hardware processor is configured to: extract first feature quantity data from sensor data; generate attention information based on a classification contribution of the first feature quantity data; generate a second feature quantity data by processing the first feature quantity data with the attention information; generate processed feature quantity data including the first feature quantity data and the second feature quantity data; and perform classification of a recognition object from the processed feature quantity data by using a classification network.

11 Claims, 11 Drawing Sheets

(51) Int. Cl.
*G06N 3/04* (2023.01)
*G06N 3/08* (2023.01)
*G06V 10/40* (2022.01)

(58) Field of Classification Search
CPC .............................. G06V 30/36–30/387; G06V 40/1365–40/1376; G06V 40/172–40/173; G06V 40/197; G06V 40/394; G06V 10/87; G06V 30/19113; G06V 30/2528; G06V 30/2552
See application file for complete search history.

(56) References Cited

OTHER PUBLICATIONS

Selvaraju et al., "Grad-CAM: Visual Explanations from Deep Networks via Gradient-based Localization", ICCV, 2017, 23 pages.
Murahari et al., "On Attention Models for Human Activity Recognition", ISWC, 2018, 4 pages.
Fukui et al., "Attention Branch Network: Learning of Attention Mechanism for Visual Explanation", The IEEE Conference on Computer and Vision Recognition (CVPR 2019), 10 pages.

* cited by examiner

RECOGNITION APPARATUS, RECOGNITION METHOD, AND PROGRAM PRODUCT

CROSS-REFERENCE TO RELATED APPLICATIONS

This application is based upon and claims the benefit of priority from Japanese Patent Application No. 2019-096345, filed on May 22, 2019; the entire contents of which are incorporated herein by reference.

FIELD

Embodiments described herein relate generally to a recognition apparatus, a recognition method, and a program product.

BACKGROUND

In recent years, with the advancement of processor or sensor performance and the reduction in size and power consumption of the processor or sensor, low-cost wearable devices are becoming more and more familiar, and health care services that log (life log) daily physical activities have been actively proposed. In addition, the scope of applications is also growing rapidly in the social infrastructure field. For example, in worksites such as manufacturing, logistics (industry), and inspection, a technique is known, in which a worker's physical activity is acquired by a sensor of a wearable device and the like, and worker's work activity is recognized from sensor data using a neural network.

DETAILED DESCRIPTION

A recognition apparatus according to an embodiment of the present disclosure includes a memory and a hardware processor coupled to the memory. The hardware processor is configured to: extract first feature quantity data from sensor data; generate attention information based on a classification contribution of the first feature quantity data; generate a second feature quantity data by processing the first feature quantity data with the attention information; generate processed feature quantity data including the first feature quantity data and the second feature quantity data; and perform classification of a recognition object from the processed feature quantity data by using a classification network.

Hereinafter, embodiments of a recognition apparatus, a recognition method, and a program product will be described in detail with reference to the accompanying drawings.

First Embodiment

Example of System Configuration

Figure 1:
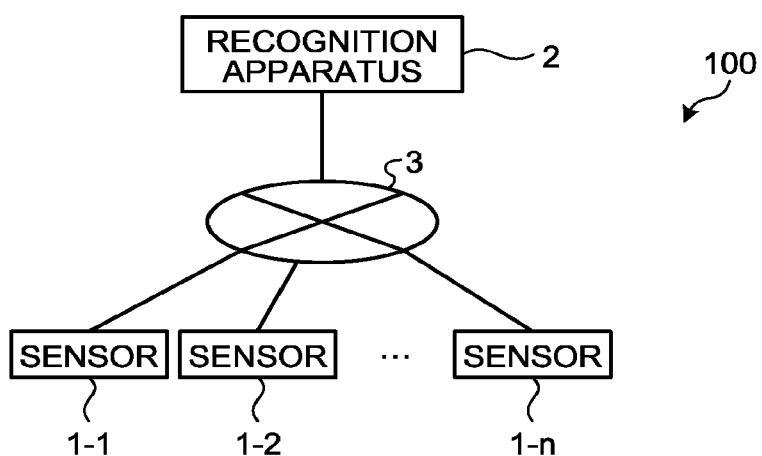
FIG. 1 is a diagram illustrating an example of a configuration of a recognition system according to a first embodiment.

FIG. 1 is a diagram illustrating an example of a configuration of a recognition system 100 according to a first embodiment. The recognition system 100 according to the first embodiment includes sensors 1-1 to 1-$n$ and a recognition apparatus 2. The sensors 1-1 to 1-$n$ and the recognition apparatus 2 are connected over a network 3. A communication system of the network 3 may be a wired system or a wireless system. In addition, the wired system and the wireless system may be combined. Hereinafter, when the sensors 1-1 to 1-$n$ are not distinguished from one another, the sensors 1-1 to 1-$n$ are simply referred to as a sensor 1.

The sensor 1 acquires sensor data indicating information on a recognition object and transmits the sensor data to the recognition apparatus 2. The sensor data represents, for example, acceleration, gyroscope, geomagnetism, body temperature, heartbeat, three-dimensional skeleton, image, and the like. The sensor 1 is, for example, a wearable sensor. The information on the recognition object is, for example, human activity information and the like.

In a case of estimating (recognizing) an activity of a person who is wearing a wearable sensor, his/her operations or works to be targeted are different and diversified depending on factories, fields, homes, offices, and fitness. Here, work environment that can be grouped by work type is called a work domain. In a work domain such as a factory, "carriage movement", "transport", "touch panel operation", "writing operation", "switch operation", and the like can be assumed as main and common work operations. On the other hand, in a logistics (industry) site such as a warehouse, work such as "bar code reading", "picking", "packing", and "forklift operation" as well as "transport" of luggage is the main work type. When a learning model is reused between different domains, it is necessary to deal with different work types depending on the domain. In addition, it is also necessary to consider the influence of different sensor configurations. Until now, it has been assumed that the sensor is attached to one arm, but it is also possible to attach a plurality of sensors to feet, trunk, or the like, taking into account accuracy first.

The recognition apparatus 2 recognizes information on a recognition object (for example, information on human activity) from sensor data.

Example of Functional Configuration

Figure 2:
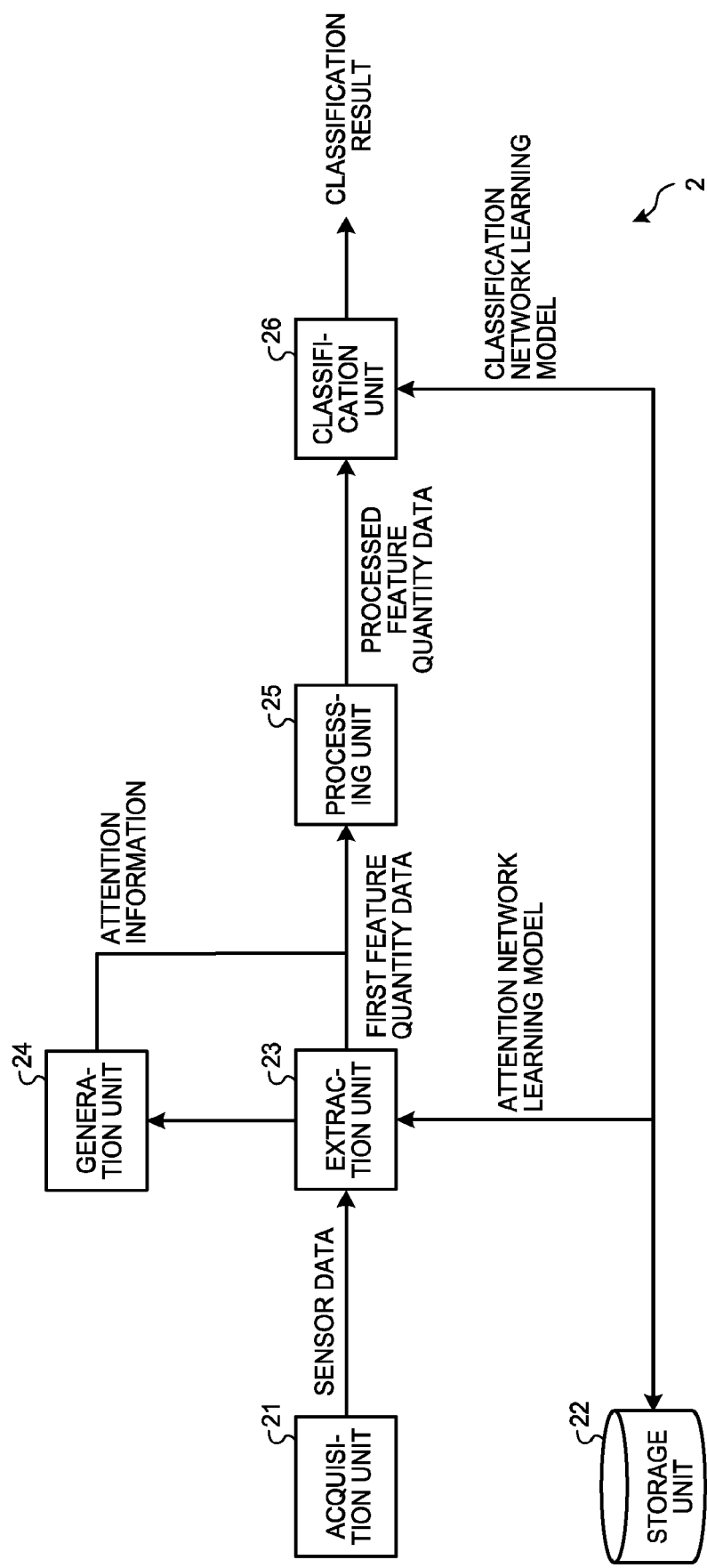
FIG. 2 is a diagram illustrating an example of a functional configuration of a recognition apparatus according to the first embodiment.

FIG. 2 is a diagram illustrating an example of a functional configuration of a recognition apparatus 2 according to the first embodiment. The recognition apparatus 2 includes an acquisition unit 21, a storage unit 22, an extraction unit 23, a generation unit 24, a processing unit 25, and a classification unit 26.

The acquisition unit 21 acquires sensor data from a sensor 1.

The storage unit 22 stores information such as a learning model. Learning models stored in the storage unit 22 of the first embodiment are an attention network learning model and a classification network learning model.

The attention network learning model is a neural network (attention network) for acquiring attention information. The attention information indicates feature quantity data to be focused when performing classification.

The classification network learning model is a neural network (classification network) for performing classification of the recognition object. Definition of the class may be arbitrary. The class is, for example, an activity, a work type, and a work operation. Specifically, for example, when activity recognition is performed in a work domain such as a factory, each class indicates "carriage movement", "transport", "touch panel operation", "writing operation", "switch operation", and the like.

The extraction unit 23 extracts first feature quantity data from the sensor data.

The generation unit 24 generates the attention information based on a classification contribution of the first feature quantity data. Details of the classification contribution will be described later.

The processing unit 25 generates second feature quantity data by processing the first feature quantity data with the attention information, and generates processed feature quantity data including the first feature quantity data and the second feature quantity data. Details of the processed feature quantity data will be described later.

The classification unit 26 performs the classification of the recognition object from the processed feature quantity data by using the classification network. The classification result obtained by the classification unit 26 may be displayed on a display or the like, stored in a storage device, or transmitted to another device connected wirelessly or by wire. The classification result by the classification unit 26 can be used for improvement in productivity (identification of time-consuming work, and the like) by recognizing a worker's work activity in the case of worksites such as manufacturing, logistics (industry), and inspection.

Example of Network Structure

Figure 3:
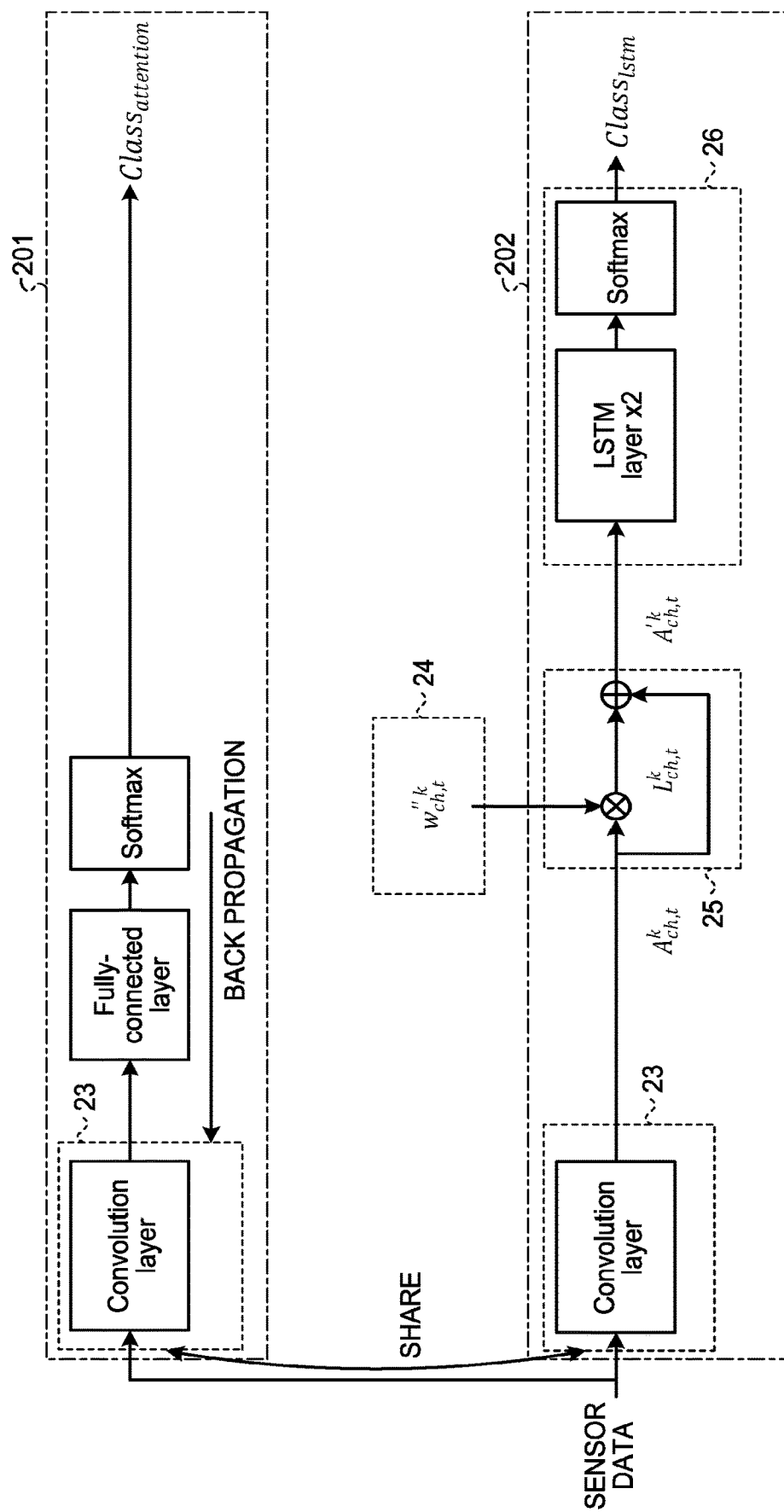
FIG. 3 is a diagram illustrating an example of a network structure according to the first embodiment.

FIG. 3 is a diagram illustrating an example of the network structure according to the first embodiment. The neural network used in the first embodiment includes an attention network 201 and a classification network 202. In the example of FIG. 3, a convolution layer of the attention network 201 and a convolution layer of the classification network 202 are shared.

The extraction unit 23 extracts the first feature quantity data (a feature map) from the sensor data by processing the convolution layer.

The generation unit 24 generates, as the attention information, a class-integrated feature map contribution in which the network structure of the attention network 201 is reflected. Here, a method for generating attention information will be described.

Figure 4:
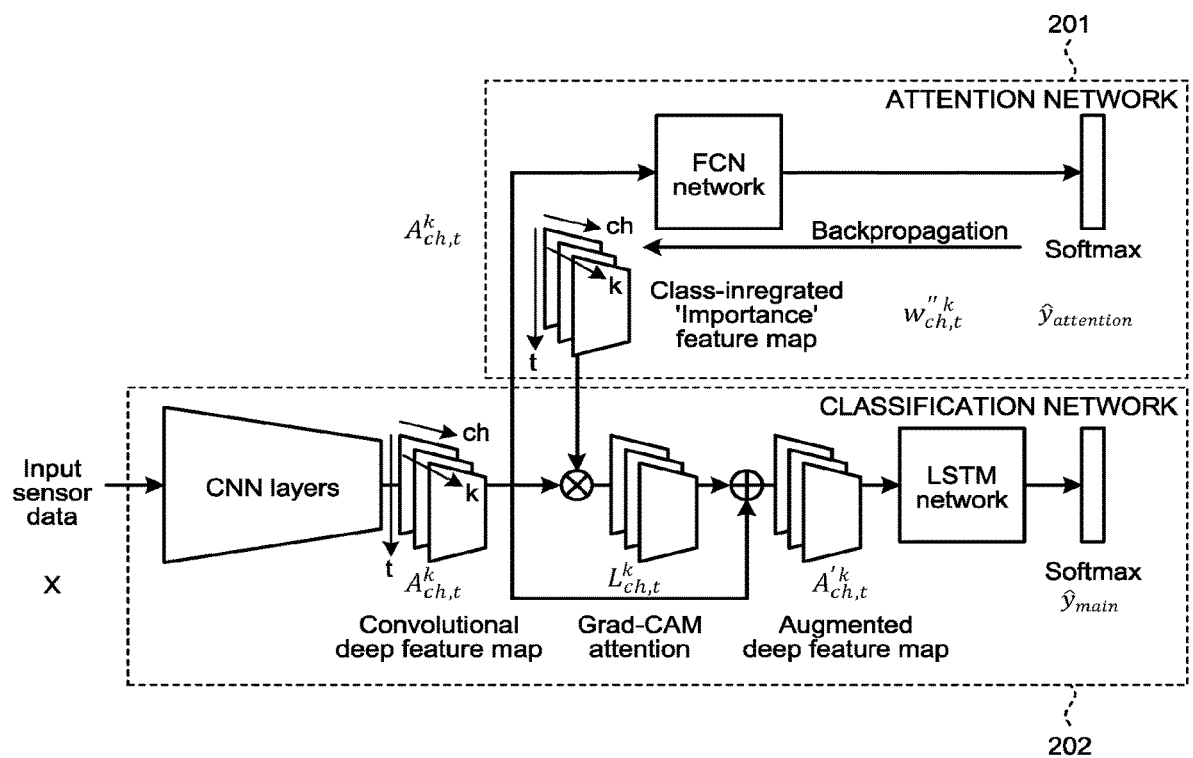
FIG. 4 is a conceptual diagram of attention application learning according to the first embodiment.

FIG. 4 is a conceptual diagram of attention application learning according to the first embodiment. Symbols denoted in FIG. 4 correspond to symbols included in reference equations described below. Details of each symbol will be described with reference to the equations.

Firstly, the generation unit 24 calculates, as differential information of a network transfer function from the convolution layer to the classification output, a feature map contribution w representing the classification contribution in the first feature quantity data (feature map) that is a feature space.

$$w_{ch}^{k,c} = \frac{1}{Z} \sum_t \frac{\partial y^c}{\partial A_{ch,t}^k} \tag{1}$$

In Equation (1) above, "y" represents an output (before Softmax application) of the attention network 201 when it is determined as class C, "A" represents the feature map in the convolution layer, "k" represents a feature map dimension, "t" represents a dimension in a time direction, "ch" represents a dimension in a channel direction, and "Z" represents the number of dimensions in the time direction in the feature map. Since the convolution processing is applied to each channel, components in the time direction in the differential information of the network transfer function are averaged over the entire feature map. The generation unit 24 calculates a class-integrated feature map contribution w' by integrating only positive components of the feature map contribution w calculated for each class, as described below.

$$w'^k_{ch} = \frac{1}{C} \sum_c ReLU(w_{ch}^{k,c}) \tag{2}$$

In Equation (2) above, a rectified linear unit ("ReLU" above) becomes 0 when a value input in one type of network activation functions is 0 or less, and outputs an input as it is when the value is greater than 0. "C" represents the total number of classes to be targeted.

The class-integrated feature map contribution w' is calculated by adding and averaging the feature map contributions w calculated for each class over all classes, but the present embodiment is not limited thereto. Alternatively, the class-integrated feature map contribution w' is calculated by performing integration in the form of a weighted average based on the class configuration in the learning data, such as a calculation of multiplying a composition ratio of the learning data belonging to the classes in the entire learning data by the feature map contributions w for each class and then summing the multiplied results in all the classes.

Next, the generation unit 24 calculates a final class-integrated feature map contribution w" by expanding a dimension such that the class-integrated feature map contribution w' becomes the same as the feature map dimension.

$$w''^k_{ch,t} = Repeat_t(w'^k_{ch}) \tag{3}$$

In Equation (3) above, "Repeat" represents a process of expanding a data dimension by repeatedly applying the class-integrated feature map contribution in the time direction.

That is, the generation unit 24 uses the attention network 201 sharing the convolution layer included in the classification network 202 to calculate the classification contributions in each element of the feature map when the classification is performed. The generation unit 24 calculates the classification contribution based on a differential transfer function for obtaining a network output from the convolution layer based on the output of the attention network 201 when the classification is performed. Specifically, the generation unit 24 calculates the classification contribution by back-propagating a transfer tendency for obtaining the network output from the convolution layer by a differential gradient from the output of the attention network 201 to the feature map that is the output of the convolution layer.

The class-integrated feature map contribution w" being the attention information is calculated by the calculation of the above Equations (1) to (3). Thus, the class-integrated feature map contribution w" is determined only from the structure of the attention network 201 (attention network learning model) without depending on the sensor data (learning data).

The processing unit 25 generates, by using Equation (4) below, the second feature quantity data (feature space attention map L), in which the classification contribution in the feature map is reflected, by multiplying class-integrated feature map contribution w" by the first feature quantity data (feature map A) for each element.

$$L_{ch,t}^{k} = w''_{ch,t}^{k} \otimes A_{ch,t}^{k} \quad (4)$$

In the second feature quantity data (feature space attention map L) obtained by the above Equation (4), only the positive classification contribution in the feature space is considered (negative contribution is not considered because the negative contribution contributes to other classes).

The processing unit 25 generates, by using Equation (5) below, the processed feature quantity data (feature map A') by adding the second feature quantity data to the first feature quantity data in consideration of a specific attention evaluation coefficient $\alpha$.

$$A'_{ch,t}^{k} = A_{ch,t}^{k} \pm \alpha_{attention} L_{ch,t}^{k} \quad (5)$$

The processing unit 25 inputs the processed feature quantity data to a long short-term memory (LSTM) layer of a post-stage.

The classification unit 26 performs the classification of the recognition object from the processed feature quantity data by performing the processing of the LSTM layer and the Softmax processing.

Figure 5:
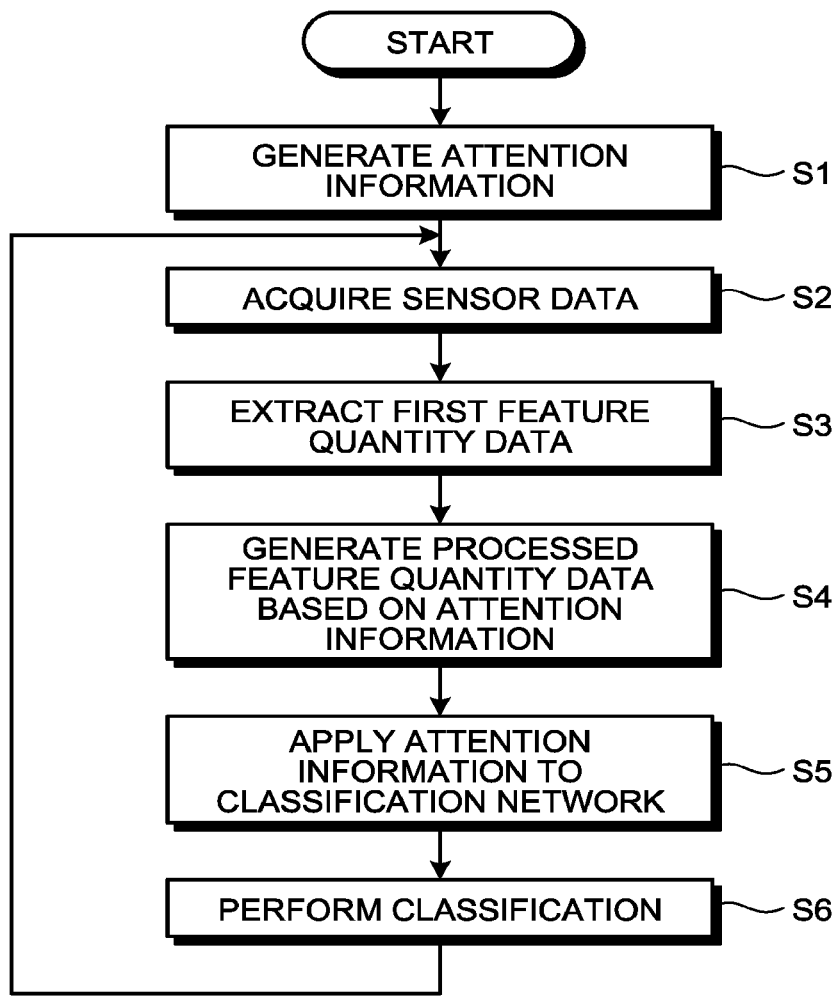
FIG. 5 is a flowchart illustrating an operation example of the recognition apparatus according to the first embodiment.

FIG. 5 is a flowchart illustrating an operation example of the recognition apparatus 2 according to the first embodiment. Firstly, the generation unit 24 generates the above-described attention information based on the classification contribution of the first feature quantity data (step S1).

The acquisition unit 21 acquires the sensor data from the sensor 1 (step S2).

The extraction unit 23 extracts the first feature quantity data from the sensor data acquired by the process of step S2 (step S3).

The processing unit 25 generates the above-described processed feature quantity data based on the attention information generated by the process of step S1 (step S4).

The processing unit 25 applies the attention information to the classification network by inputting the processed feature quantity data generated by the process of step S4 to the post-stage LSTM layer (step S5).

The classification unit 26 performs the classification of the recognition object from the processed feature quantity data by the processing of the LSTM layer and the Softmax processing (step S6). Then, processing returns to the sensor data acquisition process in step S2.

As described above, in the recognition apparatus 2 according to the first embodiment, the extraction unit 23 extracts the first feature quantity data from the sensor data. The generation unit 24 generates the attention information based on the classification contribution of the first feature quantity data. The processing unit 25 generates the second feature quantity data by processing the first feature quantity data with the attention information, and generates the processed feature quantity data including the first feature quantity data and the second feature quantity data. The classification unit 26 performs the classification of the recognition object from the processed feature quantity data by using the classification network.

According to the recognition apparatus 2 of the first embodiment, it is possible to improve the learning efficiency and learning accuracy of the neural network used for the recognition processing. Specifically, it is possible to generate the attention information only from the pre-learned attention network (attention network learning model), and it is possible to increase learning efficiency such as reducing the amount of learning data during transfer learning or additional learning and acquiring the attention information in advance. In the conventional technology, the information (attention information) to be noted during classification is not acquired in advance and not reused and the attention information needs to be generated each time the target learning data changes.

In addition, according to the recognition apparatus 2 of the first embodiment, the attention information can be reconfigured depending on the configuration of the sensor or the classification. Thus, the reusability of the network, the recognition accuracy, and the noise robustness are improved (it enables attention transfer between different domains, and enhancement of recognition of small amounts of data). In the conventional technology, the configuration of the sensor used in the work domain or the class configuration to be classified are often different. In that case, it is difficult to reuse the classification model learned in one domain and it is necessary to re-learn the network in another domain.

Second Embodiment

Next, a second embodiment will be described. In the description of the second embodiment, a description similar to that of the first embodiment is omitted.

Example of Functional Configuration

Figure 6:
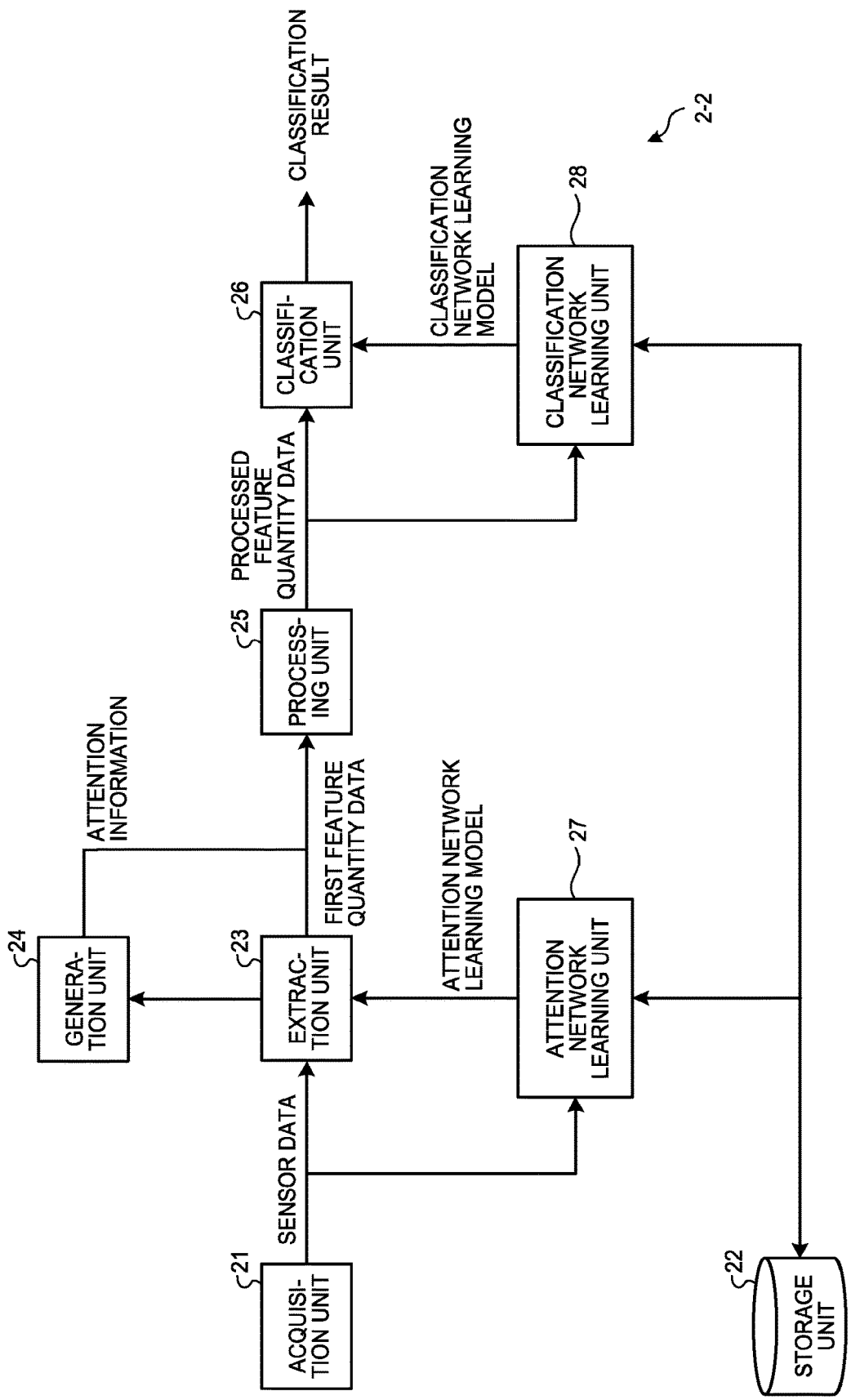
FIG. 6 is a diagram illustrating an example of a device configuration of a recognition system according to a second embodiment.

FIG. 6 is a diagram illustrating an example of a functional configuration of a recognition apparatus 2-2 according to a second embodiment. The recognition apparatus 2-2 includes an acquisition unit 21, a storage unit 22, an extraction unit 23, a generation unit 24, a processing unit 25, a classification unit 26, an attention network learning unit 27, and a classification network learning unit 28. In the second embodiment, the attention network learning unit 27 and the classification network learning unit 28 are added to the configuration of the foregoing first embodiment.

The attention network learning unit 27 learns the attention network 201 (attention network learning model).

The classification network learning unit 28 learns a classification network 202 (classification network learning model). The classification network learning unit 28 learns the classification network by defining a loss function such that strength of a feature space attention map maintains continuity in a time direction or a sensor channel direction of the feature space attention map or both directions thereof. In addition, the classification network learning unit 28 learns the classification network by defining the loss function so as to maintain consistency of the feature space attention maps for each learning epoch.

Figure 7:
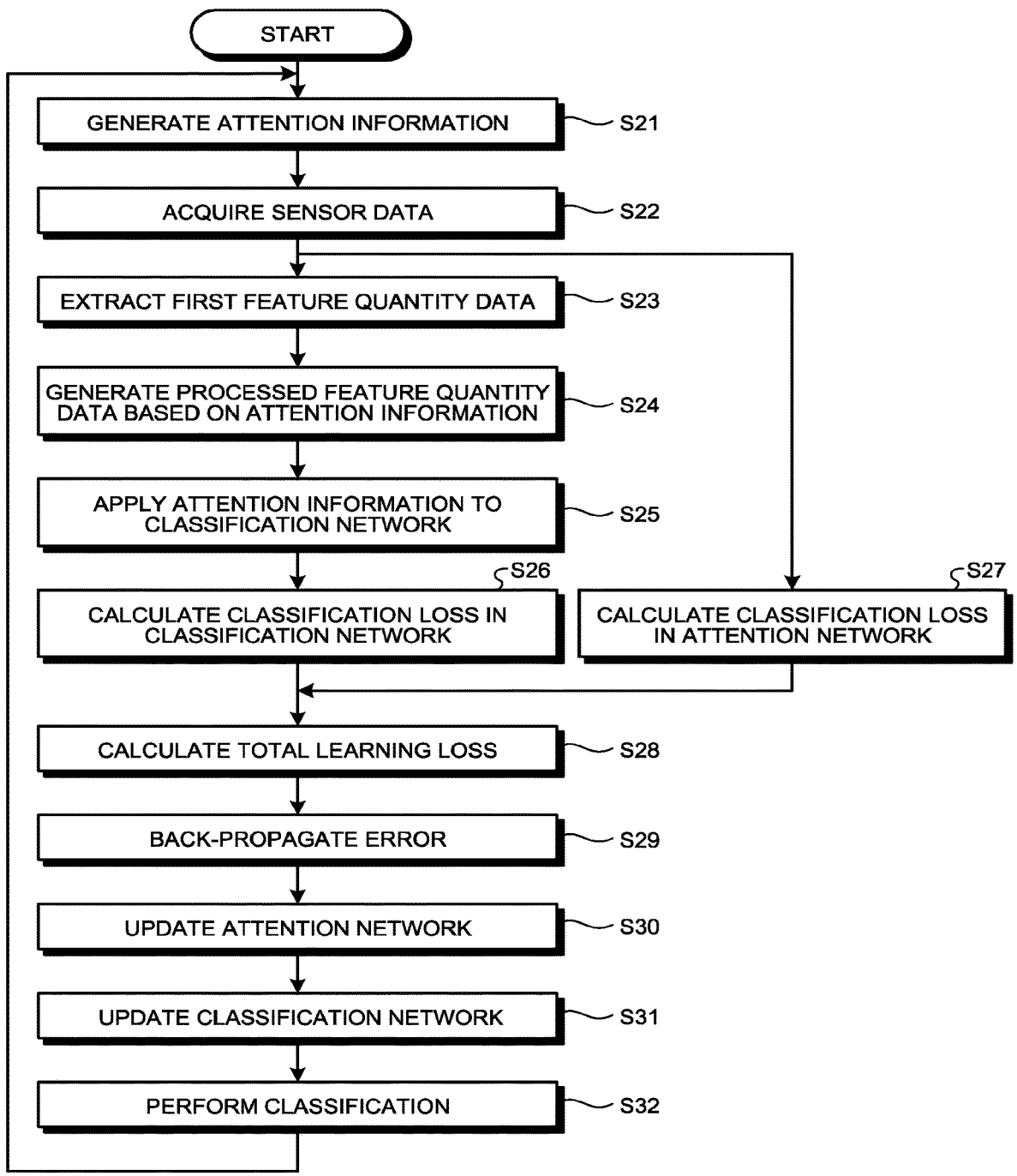
FIG. 7 is a flowchart illustrating an operation example of the recognition apparatus according to the second embodiment.

FIG. 7 is a flowchart illustrating an operation example of the recognition apparatus 2-2 according to the second embodiment. The description of step S21 to step S25 is the same as the description of step S1 to step S5 (see FIG. 5) of the first embodiment, and will be omitted.

The classification network learning unit 28 calculates a classification loss "Loss_main" in the classification network 202 (classification network learning model) as follows (step S26).

$$\hat{y} = \text{softmax}(\text{LSTM}(A'^k_{ch,t})) \quad (6)$$

$$\mathcal{L}_{main}(X, y, \alpha_{attention}) = -y \log(\hat{y}_{main}) \quad (7)$$

In Equations (6) and (7) above, "y" represents a correct-answer class, "y^" represents a prediction class by a network, "LSTM" represents an LSTM type neural network, and "softmax" represents a process of converting a neural network output into the occurrence probability of each class.

Subsequently, the attention network learning unit 27 calculates the classification loss Loss_attention in the attention network 201 (attention network learning model) as follows (step S27).

$$\hat{y}_{attention} = \text{softmax}(FCN(A^k_{ch,t})) \quad (8)$$

$$\mathcal{L}_{attention}(X, y) = -y \log(\hat{y}_{attention}) \quad (9)$$

In Equations (8) and (9) above, "y" represents the correct-answer class, "y^" represents the prediction class by the network, a fully connected network ("FCN") represents a fully connected type neural network, and "softmax" represents a process of converting a neural network output into the occurrence probability of each class.

The classification network learning unit 28 can improve the learning generalization performance by further providing the second feature quantity data (feature space attention map L) with constraints on continuity in the time direction and consistency in the learning process.

Each loss (the continuity loss and the consistency loss) corresponding to the above constraints can be obtained and reflected to learning as follows.

$$\mathcal{L}^{continuity} = \frac{1}{H} \sum_{ch} \left( \sum_t |L_{ch,t} - L_{ch,t-1}| \right) \quad (10)$$

$$\mathcal{L}^{consistency} = \frac{1}{HZ} \sum_{ch} \sum_t (|L_{ch,t} - L^{EMA}_{ch,t}|) \quad (11)$$

In Equations (10) and (11) above, "H" represents the number of dimensions in the channel direction in the feature map, and "$L^{EMA}$" is obtained by performing exponential moving average for each training data on attraction maps for each epoch updated during the network learning.

Finally, the attention network learning unit 27 and the classification network learning unit 28 calculate a total learning loss Loss based on the following Equation (12) from a previously calculated classification loss of the classification network, a classification loss of the attention network multiplied by the loss evaluation coefficient β_attention, and an attention constraint loss (continuity loss and consistency loss) obtained by multiplying loss evaluation coefficients β_continuity and β_consistency, respectively (step S28), and perform error back propagation (step S29).

$$\mathcal{L}(X, y, \alpha_{attention}, \beta_{continuity}, \beta_{consistency}) = \quad (12)$$
$$\mathcal{L}_{main}(X, y, \alpha_{attention}) + \beta_{attention} \mathcal{L}_{attention}(X, y) +$$
$$\beta_{continuity}(\mathcal{L}^{continuity}) + \beta_{consistency}(\mathcal{L}^{consistency})$$

The attention network learning unit 27 updates the attention network 201 (attention network learning model) (step S30).

In addition, the attention network learning unit 27 updates the classification network 202 (classification network learning model) (step S31).

Next, the classification unit 26 performs the classification of the recognition object from the processed feature quantity data by the processing of the LSTM layer and the Softmax processing (step S32). In the second embodiment, since the attention network 201 has been updated by the process of step S30, processing returns to the process of generating the attention information of step S21.

As described above, the recognition apparatus 2-2 according to the second embodiment includes the attention network learning unit 27 and the classification network learning unit 28. Therefore, the recognition apparatus 2-2 is capable of updating the attention network learning model and the classification network learning model.

In addition, according to the recognition apparatus 2-2 of the second embodiment, it is possible to increase the learning generalization performance by providing the second feature quantity data (feature space attention map L) with constraints on the continuity in the time direction or the consistency in the learning process.

Third Embodiment

Next, a third embodiment will be described. In the description of the third embodiment, a description similar to that of the foregoing first embodiment is omitted. In the third embodiment, a network structure different from that of the first embodiment is used (a case where the sensor configuration is the same and the class configuration is different).

Example of Network Structure

Figure 8:
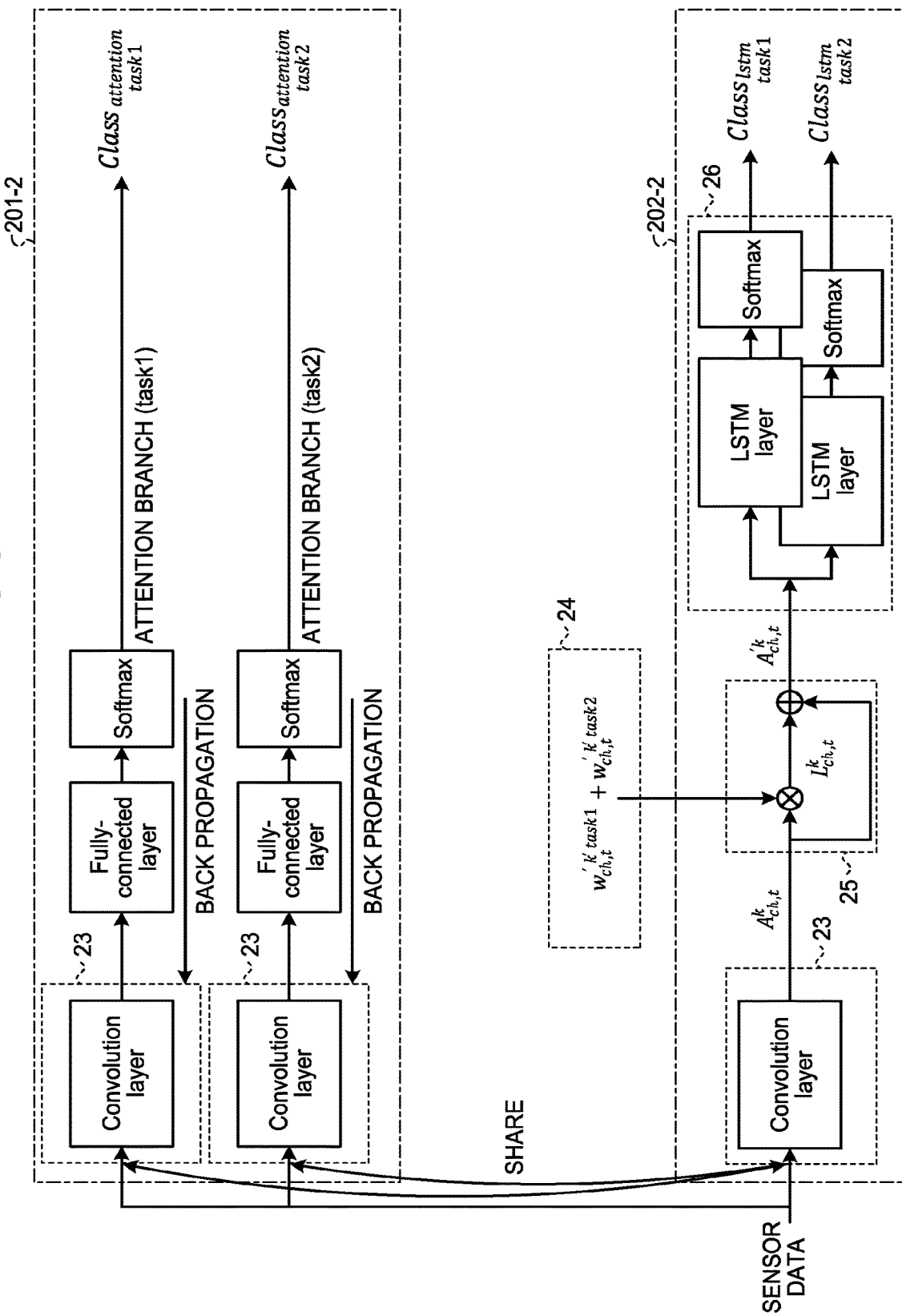
FIG. 8 is a diagram illustrating an example of a network structure according to a third embodiment.

FIG. 8 is a diagram illustrating an example of a network structure according to the third embodiment. A neural network used in the third embodiment includes an attention network 201-2 and a classification network 202-2. In the example of FIG. 8, a convolution layer of the attention network 201-2 and a convolution layer of the classification network 202-2 are shared.

In the example of FIG. 8, recognition processing is performed with two tasks from input sensor data. The tasks denote different work activity expressions and differences in different work relationships, as described below.

Task example 1: Different work activity expressions
task 1 ("stretch one's hand" or "grab") and task 2 ("carry things")

Task example 2: Different working environments
task 1 (laboratory work data) and task 2 (factory work data)

The generation unit 24 generates a class-integrated feature map contribution w"$_{task1}$ of the task 1 and a class-integrated feature map contribution w"$_{task2}$ of the task 2 according to the above-described Equation (3).

The processing unit 25 generates second feature quantity data by superimposing the class-integrated feature map contribution w"$_{task1}$ and the class-integrated feature map contribution w"$_{task2}$ on the first feature quantity data. The processing unit 25 generates processed feature quantity data by adding the second feature quantity data to the first feature quantity data. The processing unit 25 inputs the processed feature quantity data to a post-stage LSTM layer.

The classification unit 26 performs the classification of the recognition object from the processed feature quantity data by executing, for each task, the processing of the LSTM layer and the Softmax processing.

Note that the total learning loss Loss_task when the network structure is FIG. 8 is represented by the following Equation (13).

$$\mathcal{L}_{task}(X, y, \alpha_{attention}) = \\ \mathcal{L}_{main\ task1}(X, y, \alpha_{attention}) + \mathcal{L}_{main\ task2}(X, y, \alpha_{attention}) + \\ \mathcal{L}_{attention\ task1}(X, y) + \mathcal{L}_{attention\ task2}(X, y)) \quad (13)$$

As described above, in the third embodiment, the generation unit 24 generates the attention information for each classification task. The processing unit 25 synthesizes (adds) pieces of the attention information generated for each task, and generates the second feature quantity data by processing the first feature quantity data with the synthesized attention information.

Therefore, according to the third embodiment, the attention information that does not depend on the sensor data (learning data) is used, so that it is possible to improve the learning efficiency and learning accuracy of the neural network used for the recognition processing.

In addition, when there is no relation among the recognition processes performed by the tasks, the attention information may be separately applied without being synthesized. That is, the generation unit 24 may generate the attention information for each task of the classification, and the processing unit 25 may change, in dependence on the corresponding task, the attention information used for generating the second feature quantity data.

Fourth Embodiment

Next, a fourth embodiment will be described. In the description of the fourth embodiment, a description similar to that of the foregoing first embodiment is omitted. In the fourth embodiment, a network structure different from that of the first embodiment is used (that is, the class configuration is the same and the sensor configuration is different).

Example of Network Structure

Figure 9:
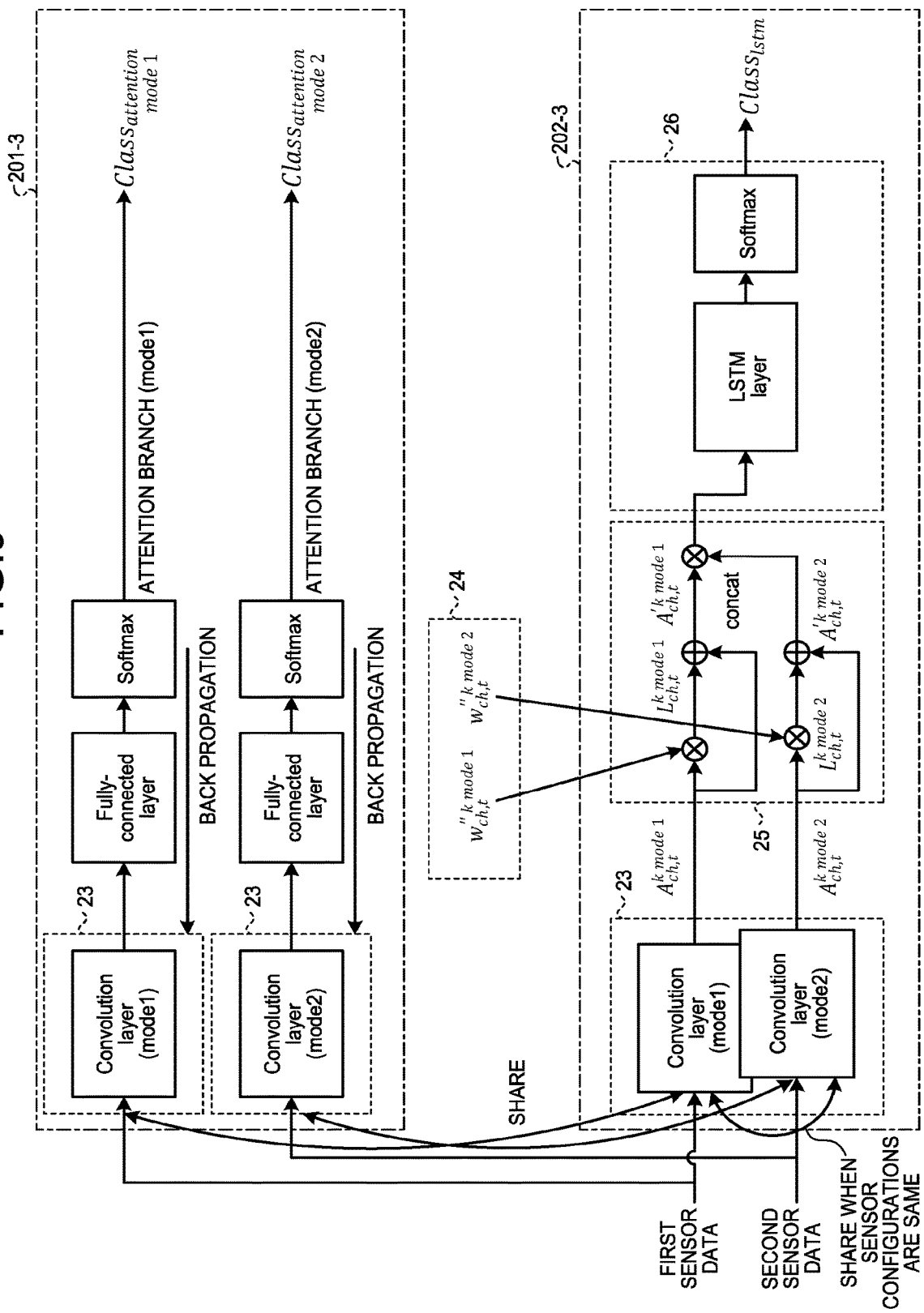
FIG. 9 is a diagram illustrating an example of a network structure according to a fourth embodiment.

FIG. 9 is a diagram illustrating an example of a network structure according to the fourth embodiment. A neural network used in the fourth embodiment includes an attention network 201-3 and a classification network 202-3. In the example of FIG. 9, a convolution layer of the attention network 201-3 and a convolution layer of the classification network 202-3 are shared.

In the example of FIG. 9, attention information is generated with two modalities from two types of input sensor data. The modality represents a difference between sensor modality and a sensor mounting region, as described below.

Modality example 1: sensor modality
mode 1 (acceleration) and mode 2 (gyro)
Modality example 2: sensor mounting region
mode 1 (head-mounted sensor group) and mode 2 (arm-mounted sensor group)
mode 1 (right-hand wearing sensor group) and mode 2 (left-hand wearing sensor group)

The generation unit 24 generates a class-integrated feature map contribution $w''_{mode1}$ of the mode 1 and a class-integrated feature map contribution $w''_{mode2}$ of the mode 2 by the above-described Equation (3).

The processing unit 25 generates second feature quantity data of first sensor data by superimposing the class-integrated feature map contribution $w''_{mode1}$ on first feature quantity data of the first sensor data. In addition, the processing unit 25 generates the processed feature quantity data of the first sensor data by adding the second feature quantity data to the first feature quantity data of the first sensor data. Similarly, the processing unit 25 generates the second feature quantity data of the second sensor data by superimposing the class-integrated feature map contribution $w''_{mode2}$ on the first feature quantity data of the second sensor data, and generates the processed feature quantity data of the second sensor data by adding the second feature quantity data to the first feature quantity data of the second sensor data.

The processing unit 25 joins the processed feature quantity data of the first sensor data and the processed feature quantity data of the second sensor data, and inputs the joined processed feature quantity data to the post-stage LSTM layer.

The classification unit 26 performs the classification of the recognition object from the joined processed feature quantity data by performing the processing of the LSTM layer and the Softmax processing.

Note that the total learning loss Loss mode when the network structure is FIG. 9 is represented by the following Equation (14).

$$\mathcal{L}_{mode}(X,y,\alpha_{attention}) = \mathcal{L}_{main}(X,y,\alpha_{attention\ mode1}, \\ \alpha_{attention\ mode2}) + \mathcal{L}_{attention\ mode1}(X,y) + \\ \mathcal{L}_{attention\ mode2}(X,y)) \quad (14)$$

As described above, in the fourth embodiment, the generation unit 24 generates the attention information for each sensor modality or each sensor mounting region. The processing unit 25 changes, for each sensor modality of the sensor from which the first feature quantity data is extracted or for each sensor mounting region, the attention information used for generating the second feature quantity data.

According to the fourth embodiment, the attention information that does not depend on the sensor data (learning data) is used, so that it is possible to improve the learning efficiency and learning accuracy of the neural network used for the recognition processing.

Fifth Embodiment

Next, a fifth embodiment will be described. In the description of the fifth embodiment, a description similar to that of the foregoing first embodiment is omitted. In the fourth embodiment, a network structure different from that of the first embodiment is used (a case where the class configuration is the same and the sensor configuration is different).

Example of Network Structure

Figure 10:
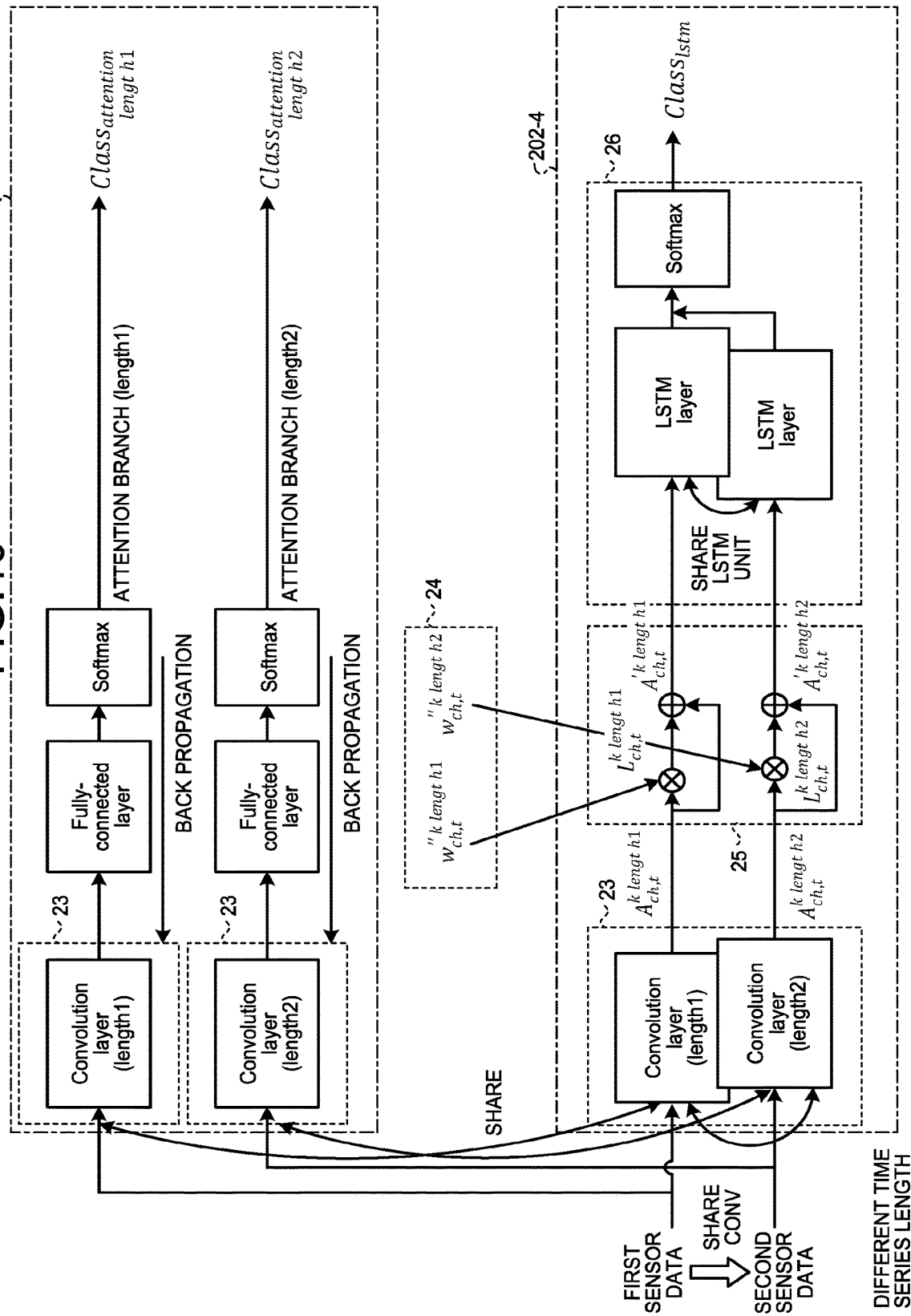
FIG. 10 is a diagram illustrating an example of a network structure according to a fifth embodiment.

FIG. 10 is a diagram illustrating an example of a network structure according to the fifth embodiment. A neural network used in the fifth embodiment includes an attention network 201-4 and a classification network 202-4. In the example of FIG. 10, a convolution layer of the attention network 201-4 and a convolution layer of the classification network 202-4 are shared.

In the example of FIG. 10, pieces of the attention information are individually generated from pieces of sensor data having different time series lengths extracted from the same input sensor data. The time series length of the first sensor data is different from that of the second sensor data. In this embodiment, the recognition processing is performed by a single classification task.

The processing unit 25 generates second feature quantity data of first sensor data by superimposing the class-integrated feature map contribution $w''_{length1}$ on first feature quantity data of the first sensor data. Then, the processing unit 25 generates processed feature quantity data of the first sensor data by adding the second feature quantity data to the first feature quantity data of the first sensor data. Similarly, the processing unit 25 generates the second feature quantity data of the second sensor data by superimposing the class-integrated feature map contribution $w''_{length2}$ on the first feature quantity data of the second sensor data, and generates the processed feature quantity data of the second sensor data by adding the second feature quantity data to the first feature quantity data of the second sensor data.

The processing unit 25 inputs, to a post-stage LSTM layer for each data having different time series lengths, the processed feature quantity data of the first sensor data and the processed feature quantity data of the second sensor data.

The classification unit 26 performs the classification of the recognition object from the processed feature quantity data by executing the processing of the LSTM layer and the Softmax processing for each sensor data having different time series lengths.

Note that the total learning loss Loss_length when the network structure is FIG. 10 is represented by the following Equation (15).

$$\mathcal{L}_{length}(X,y,\alpha_{attention}) = \mathcal{L}_{main}(X,y,\alpha_{attention\ length1}, \alpha_{attention\ length2}) + \mathcal{L}_{attention\ length1}(X,y) + \mathcal{L}_{attention\ length2}(X,y)) \quad (15)$$

As described above, in the fifth embodiment, the generation unit 24 generates the attention information from data having different time series lengths. The processing unit changes, in dependence on the different time series lengths, the attention information used for generating the second feature quantity data.

According to the fifth embodiment, the attention information that does not depend on the sensor data (learning data) is used, so that it is possible to improve the learning efficiency and learning accuracy of the neural network used for the recognition processing.

Finally, an example of the hardware configuration of the recognition apparatus 2 according to the first to fifth embodiments will be described.

Example of Hardware Configuration

Figure 11:
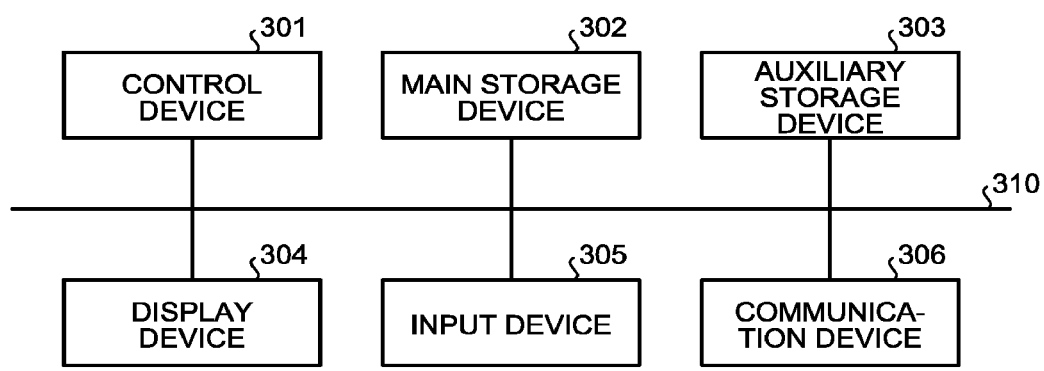
FIG. 11 is a diagram illustrating an example of a hardware configuration of the recognition apparatus according to the first to fifth embodiments.

FIG. 11 is a diagram illustrating an example of a hardware configuration of the recognition apparatus 2 according to the first to fifth embodiments.

The recognition apparatus 2 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected over a bus 310.

The control device 301 executes a program read out from the auxiliary storage device 303 to the main storage device 302. The main storage device 302 is a memory such as a read only memory (ROM) and a random access memory (RAM). The auxiliary storage device 303 is a hard disk drive (HDD), a solid state drive (SSD), a memory card, or the like.

The display device 304 displays display information. The display device 304 is, for example, a liquid crystal display, and the like. The input device 305 is an interface for operating a computer. The input device 305 is, for example, a keyboard or a mouse. When the computer is a smart device such as a smartphone and a tablet type terminal, the display device 304 and the input device 305 are, for example, a touch panel system. The communication device 306 is an interface for communicating with other devices.

The program executed on the computer is provided in the form of an installable type file or an executable type file as a computer program product that is recorded in a computer-readable storage medium such as a CD-ROM, a memory card, a CD-R, and a digital versatile disc (DVD).

The program to be executed by the computer may be stored on a computer connected to a network, such as the Internet, and may be provided by being downloaded over the network. Alternatively, the program executed by the computer may be provided over such a network without being downloaded.

The program executed by the computer may be provided by storing in a ROM or the like in advance.

The program executed by the computer has a module configuration including a functional block, which can be implemented also by a computer program, among the functional configuration (functional block) of the above-described recognition apparatus 2. In the actual hardware configuration, the control device 301 (as a hardware processor) reads out the computer program from a storage medium and executes the readout program, and thus each functional block is loaded on the main storage device 302. That is, each functional block is generated on the main storage device 302.

Note that some of or all the functional blocks described above may not be implemented by software but may be implemented by hardware such as an integrated circuit (IC).

In addition, when each function is implemented by using two or more processors, each processor may implement one of the functions, or two or more functions.

In addition, the operation form of the computer for implementing the recognition apparatus 2 may be arbitrary. For example, the recognition apparatus 2 may be implemented by a single computer. In addition, for example, the recognition apparatus 2 may be operated as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition apparatus comprising:
   a memory; and
   a hardware processor coupled to the memory and configured to:
      extract first feature quantity data from sensor data;
      generate attention information based on a classification contribution of the first feature quantity data;
      generate second feature quantity data by processing the first feature quantity data with the attention information;
      generate processed feature quantity data including the first feature quantity data and the second feature quantity data; and perform classification of a recognition object from the processed feature quantity data by using a classification network.

2. The apparatus according to claim 1, wherein the hardware processor carries out the extraction of the first feature quantity data from the sensor data by processing a convolution layer.

3. The apparatus according to claim 1, wherein the hardware processor is further configured to calculate the classification contribution, by using an attention network sharing a convolution layer included in the classification network, based on a differential transfer function for obtaining a network output from the convolution layer based on the output of the attention network when the classification is performed.

4. The apparatus according to claim 3, wherein the hardware processor carries out the generation of the attention information based on the classification contribution having a positive value among the classification contributions calculated for each class.

5. The apparatus according to claim 1, wherein the hardware processor is further configured to:
generate the attention information for each sensor modality or sensor mounting region; and
change, for each sensor modality of the sensor from which the first feature quantity data is extracted or for each sensor mounting region, the attention information used for generating the second feature quantity data.

6. The apparatus according to claim 1, wherein the hardware processor is further configured to:
generate the attention information for each task of the classification; and
change, in dependence on a corresponding task, the attention information used for generating the second feature quantity data.

7. The apparatus according to claim 1, wherein the hardware processor is further configured to:
generate the attention information for each task of the classification;
synthesize pieces of the attention information generated for each task; and
generate the second feature quantity data by processing the first feature quantity data with the synthesized attention information.

8. The apparatus according to claim 1, wherein the hardware processor is further configured to:
generate the attention information from data having different time series lengths; and
change, in dependence on the different time series lengths, the attention infoiniation used for generating the second feature quantity data.

9. The apparatus according to claim 3, wherein the hardware processor is further configured to learn the attention network and learn the classification network.

10. A recognition method implemented by a computer, the method comprising:
extracting first feature quantity data from sensor data;
generating attention information based on a classification contribution of the first feature quantity data;
generating second feature quantity data by processing the first feature quantity data with the attention information;
generating processed feature quantity data including the first feature quantity data and the second feature quantity data; and
performing classification of a recognition object from the processed feature quantity data by using a classification network.

11. A computer program product comprising a non-transitory computer-readable recording medium on which an executable program is recorded, the program instructing a computer to:
extract first feature quantity data from sensor data;
generate attention information based on a classification contribution of the first feature quantity data;
generate second feature quantity data by processing the first feature quantity data with the attention information;
generate processed feature quantity data including the first feature quantity data and the second feature quantity data; and
perform classification of a recognition object from the processed feature quantity data by using a classification network.

* * * * *